United States Patent [19]

Kinoshita et al.

[11] Patent Number: 4,828,158
[45] Date of Patent: May 9, 1989

[54] PINCH ROLLER DRIVING MECHANISM

[75] Inventors: Shigeo Kinoshita; Katsumi Yamaguchi; Kikuo Yoshikawa; Takao Kanai; Syouichiro Yokoi, all of Tokyo, Japan

[73] Assignee: Clarion Co., Ltd., Tokyo, Japan

[21] Appl. No.: 58,464

[22] Filed: Jun. 5, 1987

[30] Foreign Application Priority Data

Jun. 13, 1986 [JP] Japan .................................. 61-136108
Jun. 13, 1986 [JP] Japan .................................. 61-136109

[51] Int. Cl.[4] .......................................... B65H 20/02
[52] U.S. Cl. ..................................... 226/182; 226/187
[58] Field of Search ............... 226/181, 182, 186, 187; 242/206, 209

[56] References Cited

U.S. PATENT DOCUMENTS

| 3,877,627 | 4/1975 | Boase et al. | 226/187 X |
| 4,071,861 | 1/1978 | Hirose | 226/187 X |
| 4,133,012 | 1/1979 | Takamiya et al. | 226/187 X |
| 4,694,983 | 9/1987 | Suzuki | 226/181 |

Primary Examiner—John M. Jillions
Attorney, Agent, or Firm—Flynn, Thiel, Boutell & Tanis

[57] ABSTRACT

A pinch roller driving mechanism used in a magnetic recording and reproducing apparatus including a rotary head comprises: a pinch roller arm driving member provided on a pinch roller pull-out gear to rotate in the same direction as the gear; a pivotable pinch roller arm connected to the pinch roller arm driving member; and a pinch roller link having one end pivotably linked to one end of the pinch roller arm and the other end pivotably linked to a pinch roller block which supports a pinch roller and moves along a guide groove to bring the pinch roller into close contact with a capstan shaft.

5 Claims, 3 Drawing Sheets

PINCH ROLLER DRIVING MECHANISM

FIELD OF THE INVENTION

This invention relates to a mechanism for driving a pinch roller in a magnetic recording and reproducing apparatus including a rotary head, such as a digital audio tape recorder (DAT), and more particularly to an improved pinch roller driving mechanism which is small in size and accurate in operation.

BACKGROUND OF THE INVENTION

Together with recent progress in the digital audio technology, associated technologies for converting analog audio signals into digital signals and recording them on a tape are developed. Since a significantly wide exclusive frequency band is required to convert analog signals into digital signals, a magnetic head for signal recording or reproduction on a tape must have a wide contact area per unit time. In this respect, it is indispensable to replace a conventional fixed-head arrangement by a rotary head arrangement. Therefore, various tape recorders including a rotary head have been proposed to meet the requirement.

A tape recorder or other magnetic recording apparatus including a rotary head is configured so that loading blocks pull out the tape from a tape cassette after the tape cassette is loaded, and the loading blocks subseqently wind the tape on the rotary head. This arrangement requires that a pinch roller for establishing close contact between the tape and a capstan is movable back and forth as the loading blocks are.

In this case, the loading blocks and the pinch roller take near and parallel positions before tape loading, but they move toward the rotary head along their respective arcuate orbits. Therefore, a significant space is required for their motions. This invites a dimensional increase of the mechanism in some cases in which sufficient space is reserved for respective motions of these members.

A proposed countermeasure against this problem is to partly overlap the moving area of the loading block with the moving area of the pinch roller to decrease the entire moving space. This arrangement, however, requires control of timings of motions of the pinch roller and the loading block so as to prevent any interference between them. In this connection, one of the prior art mechanisms is provided with a timing regulating arrangement using a cam slot provided in a driving gear connected to a loading motor for engagement with a cam plate. However, this arrangement is complicated and still results in a dimensional increase of the mechanism. This is against a strong demand of dimensional reduction of a tape recorder particularly for use in a car.

Beside this, such a conventional pinch roller is configured so that its shaft supported pivotably with respect to a driving member such as a pinch roller arm is moved along a guide groove. Therefore, there remains a further problem that a possible inclination of the shaft causes an unreliable operation of the pinch roller, for example.

Further, the pinch roller in the prior art arrangement effects two motions, i.e. back and forth movement in a tape loading operation and movement for close contact with the capstan.

A prior art arrangement for effecting back and forth movement and close contact motion of the pinch roller is such that the shaft of the pinch roller is connected to one end of a pivotable pinch roller arm so that the pinch roller shaft moves back and forth along a guide groove in its back and forth motion whereas the pinch roller shaft is rotated by pushing the pinch roller arm in its close contact motion. However, this arrangement involves a problem that the pinch roller inclines in its back and forth motion or in the close contact motion and invites unreliable operation of the mechanism. Additionally, since the pinch roller arm has a flexibility to effect both operations for back and forth motion and close contact motion of the pinch roller, it is difficult for the pinch roller arm to reliably guide the pinch roller to a position ready for close contact (stop mode position) and hold it there. This sometimes results in forcible compression to the pinch roller in an erroneous position or an erroneous timing of the urging motion, which causes the pinch roller to move in an erroneous direction unabling reliable close contact with the capstan shaft.

OBJECT OF THE INVENTION

It is therefore an object of the invention to provide a pinch roller driving mechanism which permits a significant space reduction and improves the motion accuracy of the pinch roller.

A further object of the invention is to provide a pinch roller driving mechanism including a member exclusive for close contact motion of the pinch roller and independent from a member for back and forth motion of the pinch roller, so as to ensure a reliable motion of the pinch roller, and more particularly to improve the motion accuracy of the pinch roller during its close contact motion.

SUMMARY OF THE INVENTION

A pinch roller driving mechanism according to the invention comprises a pinch roller arm driving member and a pinch roller arm which are slidably, pivotably linked to each other via an elongated engage hole and located at the driving stage of the pinch roller, a pinch roller link having one end pivotably mounted on one end of the pinch roller arm and the other end pivotably supporting a pinch roller block which carries a pinch roller thereon.

The mechanism may further include a pinch roller close contact arm pivotably supported on the pinch roller block, one end of the arm being linked to the pinch roller to bring the pinch roller into close contact with a capstan shaft when the arm is urged by a pinch roller pressing member.

With this arrangement, motions of the pinch roller arm driving member and the pinch roller arm have some flexibility, and the moving areas of both members may be overlapped. Therefore, the space for motions in the entire mechanism can be decreased. Additionally, since the pinch roller arm and the pinch roller block are linked via the pinch roller link, motion of the pinch roller block also has a significant flexibility so that any configuration corresponding to the free space may be selected for the movement orbit or path of the pinch roller block, which also contributes to a space reduction. Using these advantages and placing the loading blocks and the pinch roller block so that their moving paths never overlap, movable members never interfere each other, and there occurs no problem of complicating the arrangement. Further, since the pinch roller is mounted on a pinch roller block, a significantly reliable, high-precision motion can be established.

Further, the back and forth motion of the pinch roller is effected by a reliable movement of the pinch roller block along the guide groove. As a result, the pinch roller block is reliably moved to and held at its position ready for bringing the pinch roller into close contact with the capstan. Therefore, the axle of the pinch roller arm is not moved, and if the pinch roller urging member urges the pinch roller close contact arm, the pinch roller is reliably brought into close contact with the capstan shaft.

DETAILED DESCRIPTION

Figure 1:
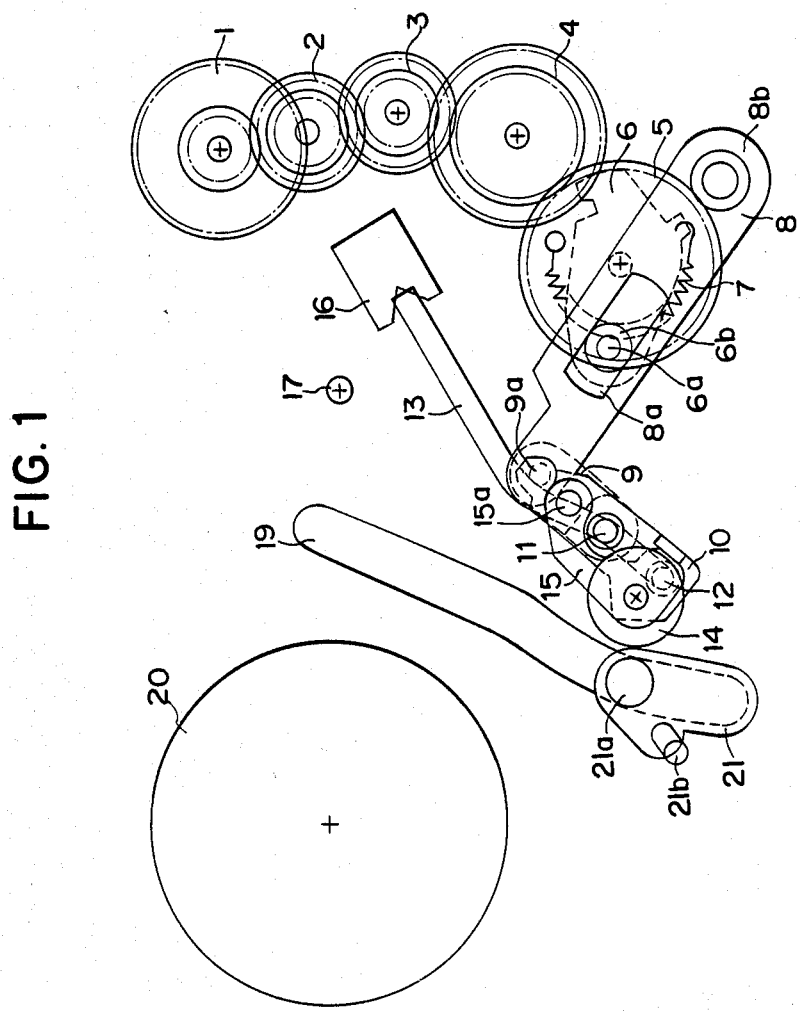
FIGS. 1 and 2 are plan views of a pinch roller driving mechanism embodying the invention.

An inventive pinch roller driving mechanism is described below in detail, referring to a preferred embodiment illustrated in the drawings.

Figure 2:
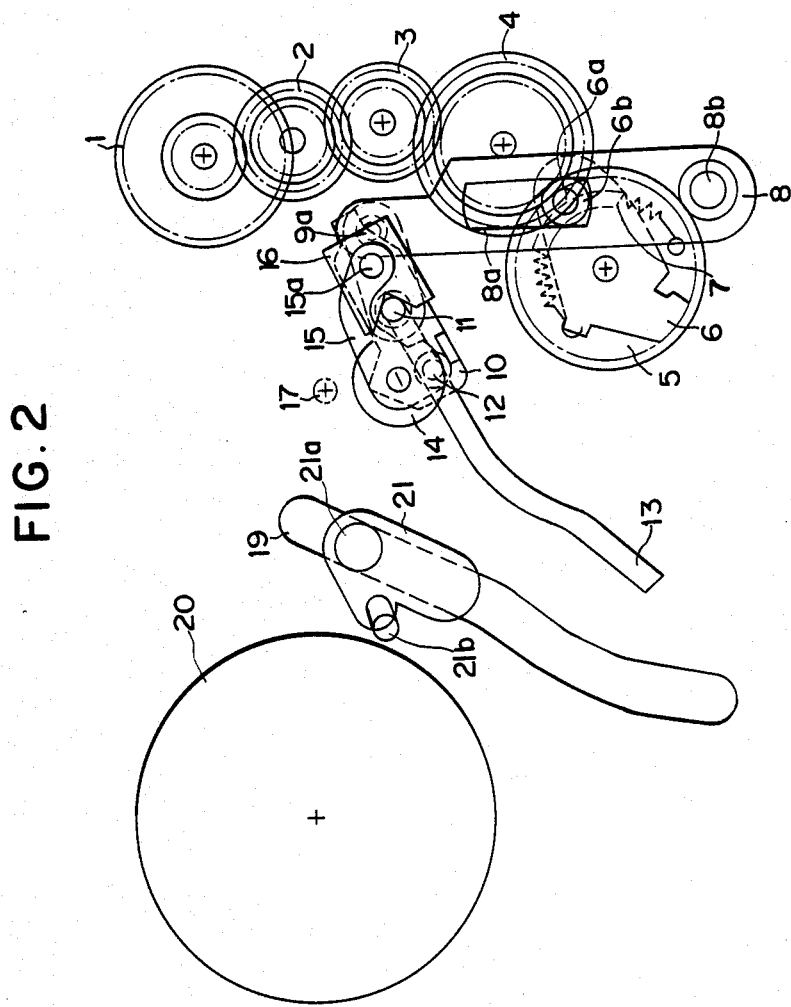

Referring to FIGS. 1 and 2, a pinch roller pull-out gear 5 is linked via three transmission gears 2 through 4 to a driving gear 1 connected to a loading motor (not shown).

The pinch roller pull-out gear 5 coaxially supports one end of a pinch roller arm driving member 6 which is biased by a spring 7 connecting it to the pinch roller pull-out gear 5 in a rotating direction of the pinch roller pull-out gear 5. Unless any external force is applied, the pinch roller arm driving member 6 rotates integrally with the pinch roller pull-out gear 5. The pinch roller arm driving member 6 has an engage pin 6a at its distal end which engages an elongated engage hole 8a of a pinch roller arm 8 so as to pivot the pinch roller arm 8 back and forth about an axle 8b when the pinch roller arm driving member 6 rotates together with the pinch roller pull-out gear 5.

The other end of the pinch roller arm 8 remote from the shaft 8b pivotably supports one end of a pinch roller link 9 via its shaft 9a. The other end of the pinch roller link 9 is pivotably mounted on a first guide pin 11 provided at the center of a pinch roller block 10. The pinch roller block 10 is moved back and forth along a pinch roller guide groove 13 by the first guide pin 11 and a second guide pin 12 which are in back and forth alignment.

Above the pinch roller block 10 is pivotably mounted a pinch roller close contact arm 15 by a shaft 15a at its front lateral end. The arm 15 has a pinch roller 14 at its rear end. The pinch roller close contact arm 15 is biased by a spring (not shown) to form an overlapping configuration with the major body of the pinch roller block 10, and engages an engage portion 10a provided on the pinch roller block 10.

A pinch roller block regulating portion 16 is provided at a front lateral end of the pinch roller guide groove 13 to engage a guide post extending upward from the first guide pin 11 so as to stop the pinch roller block 10 at its predetermined position when the pinch roller block 10 advances. Reference numeral 17 denotes a capstan shaft for close contact with the pinch roller 14.

The pinch roller pull-out gear 5 is configured to move right and left loading blocks (only one is shown at 21) back and forth via right and left loading gears (not shown).

Figure 3:
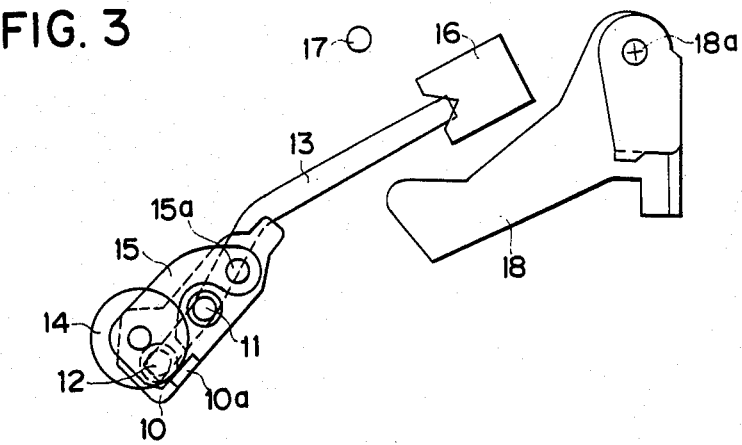
FIGS. 3 through 5 are fragmentary plan views of the same mechanism.
Figure 4:
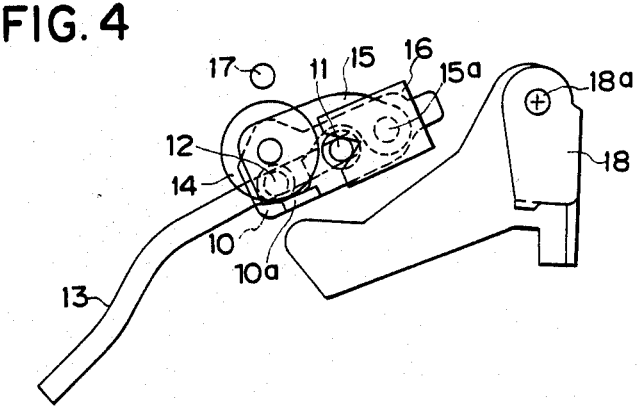
Figure 5:
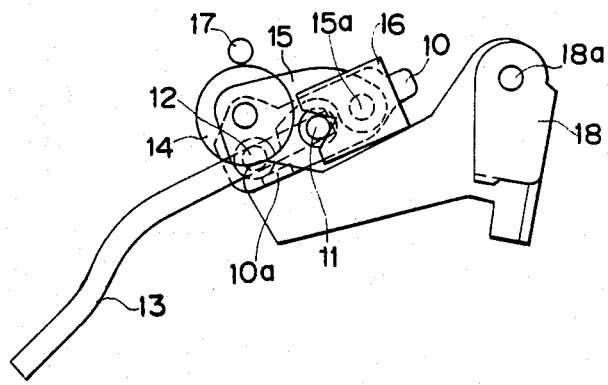

FIGS. 3 through 5 are fragmentary view of the same embodiment. Reference numeral 18 denotes a pinch roller urging member pivotable about a shaft 18a. The pinch roller urging member 18 is pivoted clockwise in the play mode by a mechanism (not shown) to urge the pinch roller close contact arm 15 in a direction for establishing close contact between the pinch roller 14 and the capstan shaft 17.

Reference numeral 19 denotes a loading guide groove, 20 refers to a rotary head, 21a to a vertical post, and 21b to an angled post.

With the above-described arrangement, the mechanism operates as follows.

Tape Loading Mode

In the tape loading mode, the loading motor begins its rotation upon completion of a cassette loading operation effected by cassette insertion. Concurrently, the driving gear 1 rotates clockwise from the position of FIG. 1.

Responsively, the pinch roller pull-out gear 5 is rotated clockwise via the transmission gears 2 through 4, causing integral rotation of the pinch roller arm driving member 6 and pivotal movement of the pinch roller arm 8 about the shaft 8b. As a result, the pinch roller block 10 moves ahead along the guide groove 13 from its retreated position shown in FIGS. 1 and 3. Therefore, the pinch roller 14 supported on the pinch roller block 10 is brought ahead.

Finally, as shown in FIGS. 2 and 4, the pinch roller block 10 stops at a predetermined position due to engagement between the guide post of the first guide pin 11 and the pinch roller block regulating portion 16. When the tape contacts the rotary head 20, the drive gear 1 stops after a slight rotation, and the transmission gears 2 to 4 and the pinch roller pull-out gear 5 stop accordingly.

Play Mode

In the play mode of the tape player, the pinch roller urging member 18 is rotated clockwise as shown in FIG. 5 from the stop position of FIGS. 2 and 4, and pushes the pinch roller close contact arm 15 to rotate it in the same direction, so that the pinch roller 14 at the distal end thereof closely contacts the capstan shaft 17.

Ejection Mode

In the ejection mode of the tape player, the loading motor is rotated in the opposite direction from the stop mode of FIGS. 2 and 4, and respective gears also rotate in the opposite directions with respect to their rotating directions in the aforegoing loading mode, so that the pinch roller block 10 retreats. The pinch roller block 10 finally takes its retreated position shown in FIGS. 1 and 3. As a result, the cassette loading motor is energized to perform a cassette ejecting operation.

As described above, the pinch roller 14 is mounted on the pinch roller block 10 which engages the pinch roller guide groove 13 via the first and second guide pins 11 and 12, and the pinch roller 14 takes a significantly stable orbit in its back and forth movement. Therefore, inclination of the pinch roller 14 and other problems involved in the prior art technology are eliminated.

In the stop mode of the tape player, the pinch roller block 10 is reliably held by the pinch roller block regulating portion 16 at its position ready for pressure contact of the pinch roller 14 against the capstan shaft 17. Therefore, the shaft 15a of the pinch roller close contact arm 15 is also held immovable at its predetermined position. This ensures a very accurate orbit of the pinch roller 14 following to a pivotal movement of the pinch roller close contact arm 15. That is, the pinch roller 14 can reliably contacts the capstan shaft 17.

The invention is not limited to the illustrated embodiment. For example, any appropriate mechanism may be employed for driving the pinch roller block 10. The pinch roller guide groove 13, pinch roller block 10 and pinch roller close contact arm 15 may have any other appropriate configurations. Further, the tape loading mechanism and other mechanisms cooperative with the invention mechanism may also have any appropriate arrangements.

As described heretofore, the invention employs a simple arrangement in which the pinch roller is mounted on the pinch roller block which is driven by the pinch roller arm driving member and by the pinch roller arm engaging therewith via the elongated hole. This arrangement, although simple, improves the flexibility of motions of the members, and increases the overlapping area of the motion spaces of the members. This results in a decrease of the entire motion space in the mechanism and a scale reduction of the mechanism. Beside this, the invention employs a simple arrangement in which the pinch roller close contact arm having the pinch roller thereon is pivotably mounted on the pinch roller. With this arrangement, back and forth motion of the pinch roller is effected by a member other than a member for effecting its close contact motion. This greatly improves the movement accuracy of the pinch roller and ensures its reliable operation.

What is claimed is:

1. A pinch roller driving mechanism in a magnetic recording and reproducing apparatus including a rotary head, said pinch roller driving mechanism comprising:
   a pinch roller pull-out gear driven by a loading motor;
   a pinch roller arm driving member provided on said gear and rotatable in the same direction with said gear;
   a pivotable pinch roller arm;
   a movable pinch roller block supporting a pinch roller;
   a pinch roller link having one end pivotably connected to one end of said pinch roller arm and the other end pivotably connected to said pinch roller block;
   a guide groove engaging said pinch roller block to guide its movement; and
   an elongated hole provided in one of said pinch roller arm driving member and said pinch roller arm to slidably pivotably engage an engage portion provided on the other of said pinch roller arm driving member and said pinch roller arm.

2. A pinch roller driving mechanism of claim 1 further comprising: a pinch roller close contact arm supporting said pinch roller on one end thereof and pivotably mounted on said pinch roller block; and a pinch roller urging member provided at a final end of said guide groove to urge said pinch roller close contact arm to bring said pinch roller into close contact with a capstan shaft.

3. A pinch roller driving mechanism of claim 2 further comprising a pinch roller block regulating portion provided at said final end of said guide groove.

4. A pinch roller driving mechanism in a magnetic recording and reproducing apparatus including a rotary head, said pinch roller driving mechanism comprising:
   a pinch roller pull-out gear supported for rotation about an axis of rotation and driven by a loading motor;
   a pinch roller arm driving member separate from said pull-out gear and supported for rotation about said axis of rotation, and means for effecting rotation of said pinch roller arm driving member with and in the same direction as said gear in response to rotation of said gear;
   a guide groove formed in a base plate of said apparatus; and
   pinch roller support means for rotatably supporting a pinch roller, said pinch roller support means being supported by said guide groove for movement therealong, and means operatively coupling said pinch roller support means to said pinch roller arm driving member for effecting movement of said pinch roller support means along said groove in response to rotational movement of said pinch roller arm driving member;
   wherein said means operatively coupling said pinch roller support means and said pinch roller arm driving member includes a movable pinch roller arm, and includes an elongate hole provided in one of said pinch roller arm driving member and said pinch roller arm to slidably pivotably engage an engage portion provided on the other of said pinch roller arm driving member and said pinch roller arm.

5. A pinch roller driving mechanism according to claim 4, wherein said pinch roller support means includes a pinch roller block supported by said groove for movement therealong, and means rotatably supporting said pinch roller on said pinch roller block, and wherein said means operatively coupling said pinch roller support means and said pinch roller arm driving member includes a pinch roller link having one end pivotably connected to one end of said pinch roller arm and the other end pivotably connected to said pinch roller block.

* * * * *